(12) United States Patent
Roy Chowdhury et al.

(10) Patent No.: US 11,532,025 B2
(45) Date of Patent: Dec. 20, 2022

(54) DEEP COGNITIVE CONSTRAINED FILTERING FOR PRODUCT RECOMMENDATION

(71) Applicant: INTERNATIONAL BUSINESS MACHINES CORPORATION, Armonk, NY (US)

(72) Inventors: Sujoy Kumar Roy Chowdhury, Kolkata (IN); Tanveer Akhter Khan, Indore (IN); Ria Chakraborty, Kolkata (IN); Yogesh Narasimha, Bangalore (IN); Kartikeya Vats, Uttarakhand (IN); Khyati Baradia, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 16/538,040

(22) Filed: Aug. 12, 2019

(65) Prior Publication Data
US 2021/0049665 A1    Feb. 18, 2021

(51) Int. Cl.
*G06Q 30/06*     (2012.01)
*G06N 3/08*      (2006.01)
(Continued)

(52) U.S. Cl.
CPC ..... *G06Q 30/0631* (2013.01); *G06F 16/9035* (2019.01); *G06F 16/9038* (2019.01);
(Continued)

(58) Field of Classification Search
CPC .......... G06F 16/90348; G06F 16/9035; G06F 16/9038; G06N 3/08; G06N 3/088;
(Continued)

(56) References Cited

U.S. PATENT DOCUMENTS

| 6,266,649 B1* | 7/2001 | Linden ............. G06Q 10/08345 |
| | | 705/14.51 |
| 8,386,519 B2* | 2/2013 | Kenedy .................. G06Q 30/02 |
| | | 707/784 |

(Continued)

FOREIGN PATENT DOCUMENTS

| CN | 105005701 | 10/2015 |
| CN | 105005701 A | * 10/2015 |
| CN | 108428166 | 8/2018 |

OTHER PUBLICATIONS

Prevost, et al., Deep Inventory Time Translation To Improve Recommendations for Real-World Retail, URL: Retrieved from Internet: https://dl.acm.org/citation.cfm?id=3240380&dl=ACM&coll=DL, Oct. 2-7, 2018, pp. 195-199.

(Continued)

*Primary Examiner* — Adam L Levine
(74) *Attorney, Agent, or Firm* — Schmeiser, Olsen & Watts, LLP; Michael A. Petrocelli

(57) ABSTRACT

A system and method for modeling preferences of customers to drive personalized contextual recommendations using cognitive deep constrained filtering includes receiving a user query on an online retail platform, in response to receiving the user query, performing a first online matrix manipulation and a second online matrix manipulation, and sending a list of ranked recommended products.

17 Claims, 16 Drawing Sheets

(51) Int. Cl.
G06F 16/903 (2019.01)
G06F 16/9038 (2019.01)
G06F 16/9035 (2019.01)

(52) U.S. Cl.
CPC ......... *G06F 16/90348* (2019.01); *G06N 3/08* (2013.01); *G06Q 30/0633* (2013.01); *G06Q 30/0639* (2013.01)

(58) Field of Classification Search
CPC ......... G06Q 30/06–0645; G06Q 30/08; G06Q 50/01; G16Y 10/00–90
See application file for complete search history.

(56) References Cited

U.S. PATENT DOCUMENTS

| | | | | |
|---|---|---|---|---|
| 9,569,499 | B2* | 2/2017 | Kami | G06Q 30/02 |
| 10,255,628 | B2* | 4/2019 | Li | G06Q 30/0631 |
| 10,367,862 | B2* | 7/2019 | Li | G06F 3/00 |
| 11,151,203 | B2* | 10/2021 | Natchu | G06F 16/951 |
| 2010/0268661 | A1* | 10/2010 | Levy | G06Q 30/02 705/347 |
| 2011/0112981 | A1 | 5/2011 | Park | |

OTHER PUBLICATIONS

Authors: Disclosed Anonymously, Cognitive Retail Catalog Based On User Clothing Style, IP.com No. IPCOM000249384D, IP.com Electronic Publication Date: Feb. 23, 2017, Retrieved from Internet: URL: https://priorart.ip.com/IPCOM/000249384, 3 pages.

Mell, Peter et al.; "The NIST Definition of Cloud Computing;" National Institute of Standards and Technology; Special Publication 800-145; Sep. 2011; 7 pages.

Adomavicius et al.; Context-aware recommender systems. In Recommender systems handbook (starting on p. 217). Boston: Springer; F. Ricci et al. (eds.), Recommender Systems Handbook, DOI 10.1007/978-0-387-85820-3_7, © Springer Science+Business Media, LLC 2011, 67 pages.

Burke et al., (2002). Hybrid recommender systems: Survey and experiments. User modeling and user-adapted interaction, (pp. 331-370), Department of Information Systems and Decision Sciences, California State University, Fullerton, CA 92834, USA (Received Jan. 23, 2000; accepted in revised form Sep. 24, 2001).

Hu et al., (2008), Collaborative filtering for implicit feedback datasets. IEEE, 10 pages.

* cited by examiner

DEEP COGNITIVE CONSTRAINED FILTERING FOR PRODUCT RECOMMENDATION

TECHNICAL FIELD

The present invention relates to systems and methods for product recommendation, and more specifically to embodiments of a recommendation system for modeling preferences of customers to drive personalized contextual recommendations using cognitive deep constrained filtering.

BACKGROUND

Recommendation systems are used by online shopping platforms to assist a user in locating a product.

SUMMARY

An embodiment of the present invention relates to a method, and associated computer system and computer program product for modeling preferences of customers to drive personalized contextual recommendations using cognitive deep constrained filtering. A processor of a computing system receives a user query on an online retail platform. In response to receiving the user query, the processor performs a first online matrix manipulation and a second online matrix manipulation. The first online matrix manipulation includes querying a customer similarity matrix to identify customers most similar to the user, creating a user feature matrix and a product features matrix specific to the user and the product in the user query, and obtaining a sparse data matrix based on the customer similarity matrix, the user feature matrix and the products feature matrix. The second online matrix manipulation includes creating a product similarity matrix based on a candidate set of attributes extracted from the user query, filtering the results of the sparse data matrix with the product similarity matrix to a list of ranked recommended products for the user, and sending, the list to the user.

DETAILED DESCRIPTION

Figure 1:
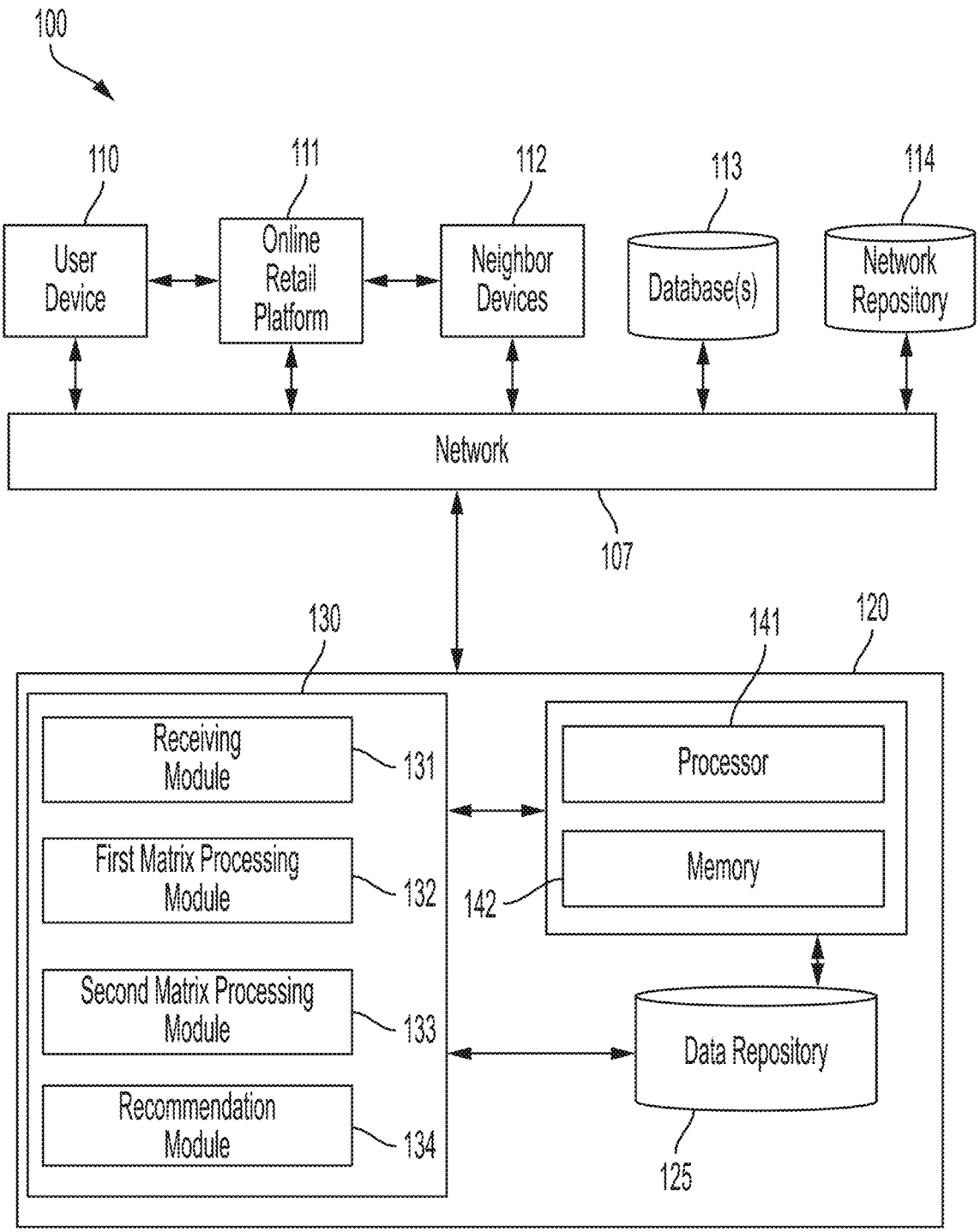
FIG. 1 depicts a block diagram of a recommendation system, in accordance with embodiments of the present invention.

Embodiments of the present invention relate to a method and system for modeling the preferences of customers to drive personalized contextual recommendations using cognitive deep constrained filtering. The recommendations rely on customer's preferences inferred from data sources, such as past purchases, a page view, online shopping cart, wishlist information, demographics, price sensitivity, weather, events, social group influences, and the like. The data sources are used to personalize recommendations for products pertaining to a queried context within an online retail platform. Data from a model is subsequently arranged to display the availability in an inventory along with price and average rating.

Recommendation systems (RS) are used by online platforms for the success of any customer-oriented solution. Despite RS availability in different variants, conventional RS struggle to mitigate the following challenges.

First, a number of offerings hosted by the online retail platform can be too many and thus adversely affect RS. For example, millions of different products can be difficult to quickly analyze for the most accurate recommendation specific to the user. Generating recommendations for such a large variety of products is often tedious and requires a large and robust infrastructure. Even with a large and robust infrastructure having the required computing resources, a substantial portion of such recommendations often go unused.

Second, it is a challenge to generate recommendations in real time with dynamic constraints while adhering to timely responses in a real-time setup in choices of the order of millions. In addition, certain products exhibit stronger association with certain attributes. For example, "fit" may be most important for "jeans", whereas "style" may be most important for "dresses." Conventional RS fail to leverage this information while generating recommendations for the user.

Third, conventional collaborative filtering algorithms rely on "rating" systems to derive preferences for several products. However, in certain retail industries, such as the fashion industry, data is excessively sparse and therefore leads to very poor or no results for conventional RS.

Fourth, conventional RS struggle with products related to industries with fast-moving trends, such as the fashion industry. In these industries, products have shorter lifespans and may also be impacted by weather. By way of example, the fashion industry brings in new SKUs with similar attributes every fashion season (e.g. typically 2-3 months). Each new "season" brings in new fashion trends which may not have previously existed.

Fifth, it is a challenge for conventional RS to provide recommendations for cold start problems.

Accordingly, embodiments of the method and system for modeling the preferences of customers to drive personalized contextual recommendations using cognitive deep constrained filtering solve the above challenges using a real time deep constrained collaborative filtering technique, which leverages the fact that users' interest spawns only with a handful of products available for recommending to the user. In an exemplary embodiment, the customer interacts with the online retail platform using the system described herein. For example, the user interacts with a chat-bot, conversing in a natural language with the user as part of a front end of the online retail platform. Furthermore, the deep constrained collaborative filtering leverages the fact that users interact with only a handful of offerings of the online retail platform, and user-related features are independent of the actual conversation context, which can be precomputed even though the actual contextual information is made available. Thus, a recommendation system personalizes the recommendations pertaining to the context derived from the user's conversation with the front end of the online retail platform, such as a conversation agent or chat-bot application.

Moreover, embodiments of the present invention work with extremely sparse data (e.g. <0.01%) and constrains the recommendations to be only within a specified candidate set based on a user query into the online retail platform. As a result, faster recommendations can be presented to the user, for example, in real-time during a conversation with a chat-bot, while explicit preferences of the customer are not violated. The recommendations are therefore limited to the constrained set defined by the candidate set of the customer query. Additionally, embodiments of the present invention use customer attributes based on a customer similarity matrix and implements online matrix manipulations in a two-part implementation. For example, customer similarities identified from customer features and product similarities identified from product features are used along with an entire history of a customer "neighborhood" to identify important products to the user as a function of the provided recommendation.

Advantages of the embodiments of the present invention include the ability to recommend goods inside a defined candidate set, even in extremely sparse datasets (<0.01% sparsity), handle customer cold start problems and product cold start problems, and reusability due to an independence from legacy stack data.

The system and method for modeling preferences of customers to drive personalized contextual recommendations using cognitive deep constrained filtering is based on a mathematical formula:

The Cognitive Constrained Filtering (CCF) score $\omega_1$ of the product $P_j$ for a customer $C_i$ is given by $$\omega_{1i} = \sum_{j \in N(C_1)} \sum_{k \in N(P_i)} C_{sim}(C_1, C_j) * U_{jk} * P_{sim}(i, k)$$

where
$\mathcal{N}(C_1)$ gives the neighbours of customer $C_1$ (includes $C_1$ also)
$C_j$ is any customer in the neigbourhood of $C_1$
$\mathcal{N}(P_i)$ gives the neighbours of product $P_i$ ($P_i$ also)
$P_k$ is any product in the neighbourhood of $P_i$.

A little manipulation yields a matric multiplication in the form $$W = CUP$$

where W is a N×M weight vector, C is a N×N customer similarity matrix, L is a N×M utility matric and P is a M×M product similarity matrix.

We are interested in one row of the W matrix corresponding to the customer in question and only the columns whose products match the attributes the customer is interested in.

We use the sparsity conditions of these 3 matrices for an efficient on-line manipulation.

The fact that the utility matrix is decomposed approximately into two matrix $F_u$ and $F_i$ as a low rank approximation converts the matrix multiplication into the form $$W \approx CF_u F_i P$$

Referring now to the drawings, FIG. 1 depicts a block diagram of a recommendation system 100, in accordance with embodiments of the present invention. The recommendation system 100 is a system for modeling preferences of customers to drive personalized contextual recommendations using cognitive deep constrained filtering. The recommendation system 100 may be useful for providing real-time tailored product recommendations even in situations with a sparse data surrounding a particular product. Embodiments of the recommendation system 100 may be alternatively referred to a cognitive constrained filtering system, a filtering system, a deep cognitive recommendation system, and the like.

The recommendation system 100 includes a computing system 120. Embodiments of the computing system 120 include a computer system, a computer, a server, one or more servers, a backend computing system, and the like. The computing system 120 may be one or more servers servicing an online retail platform being used by the user.

Furthermore, the user profile selection system 100 includes a user device 110, an online retail platform 111, neighbor devices 112, and one or more databases 113 that are communicatively coupled to the computing system 120 over a network 107. For instance, information/data is transmitted to and/or received from the user device 110, the online retail platform 111, the neighbor devices 112, and the one or more databases 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases, such as network repository 114, which are network repositories containing information of the user preferences, neighbor preferences, previous product recommendations, search history, etc., network repositories or other systems connected to the network 107 that are considered nodes of the network 107. In an embodiment where the computing system 120 or network repositories allocate resources to be used by the other nodes of the network 107, the computing system 120 and network repository 114 is referred to as servers.

The network-accessible knowledge bases 114 is a data collection area on the network 107 which backs up and save all the data transmitted back and forth between the nodes of the network 107. For example, the network repository is a data center saving and cataloging user preferences, neighbor preferences, previous product recommendations, search history, etc., and the like, to generate both historical and predictive reports regarding a particular user and/or product recommendation. In an exemplary embodiment, a data collection center housing the network repository 114 includes an analytic module capable of analyzing each piece of data being stored by the network repository 114. Further, the computing system 120 can be integrated with or as a part of the data collection center housing the network repository 114. In an alternative embodiment, the network repository 114 is a local repository that is connected to the computing system 120.

The user device 110 is a user computing device. The user computing device can be a computing device, a computer, a desktop computer, a cell phone, a mobile computing device, a tablet computer, a laptop computer, a wearable computing device, a smartwatch, and the like. The user device 110 can include hardware functionality such as a speaker for emitting a sound, a vibration motor for creating vibrations, a GPS sensor for tracking a location of the user device 110, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

The online retail platform 111 is a service, software application, platform, website, and the like, which can be used by the user to purchase products online. The online retail platform 111 includes a front end user interface that permits a user to input a search query for a particular product or to ask for a recommendation based on a description provided by the user. The front end user interface may include a search tool or an interactive conversation mechanism, such as a chat-bot. The user interactive software permits a user to receive recommendations in real time based on the user's input regarding a product of interest.

The neighbor devices 112 are computing devices owned, operated by, or located on the persons of customers determined to be similar to the user (i.e. "neighbors"). The neighboring devices 112 can be a computing device, a computer, a desktop computer, a cell phone, a mobile computing device, a tablet computer, a laptop computer, a wearable computing device, a smartwatch, and the like, associated with an individual other than the user. The neighbor device 112 can include hardware functionality such as a speaker for emitting a sound, a vibration motor for creating vibrations, a GPS sensor, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. The neighbor device 112 can be configured to share data with the computing system 120 that can be helpful for generating a recommendation for the user. The collection of data from neighboring devices 112 is only done with the knowledge and consent of the third party, and can be turned off at any time, thereby respecting the privacy of the and the third party.

The one or more databases 113 are databases or other storage devices that store matrix data and other information useful for the recommendation system 100. One such database is an in-memory database with a unique key for conversation, wherein data is stored in a dictionary format for interpretations of matrix data.

Referring still to FIG. 1, the computing system 120 of the recommendation system 100 is equipped with a memory device 142 which stores various data/information/code, and a processor 141 for implementing the tasks associated with the recommendation system 100.

A recommendation application 130 is loaded in the memory device 142 of the computing system 120. The recommendation application 130 can be an interface, an application, a program, a module, or a combination of modules. In an exemplary embodiment, the recommendation application 130 is a software application running on one or more back end servers (e.g. computing system 120), servicing the online retail platform 111 and/or the user device 110. In other embodiments, the recommendation application 130 is a software application running on the user's mobile device 110. In further embodiments, aspects of the recommendation application 130 are loaded onto the computing system 120 and the user mobile device 110 and other devices connected to the computing system 120 over the network 107.

The recommendation application 130 of the computing system 120 is a fast and scalable plug-n-play system which can be integrated with a natural language based conversational program (e.g. chat-bot) that implements a recommender for a Natural Language query-based platform and places new demands on top of conventional RS. For instance, recommendation application 130 generates recommendations even under a constrained candidate set determined by the parameters of the user query. Thus, if the user query contains a request for a certain combination of attributes (e.g. product='jeans', color='blue', brand='Levis'), the recommendation will be happening only for products that match these attributes in the candidate set. The recommendation uses user preferences to rank order the products that match the candidate set.

Moreover, recommendation application 130 performs online matrix manipulations to achieve a fast response time, which is required from the perspective of user-interaction. The online matrix manipulations are performed online and in real time to accommodate millions of customers, leading to matrices of the order of $10^{12}$, as an example. Even with massive computing power updating such large matrices, it would take a very long amount of time (e.g. $10^{12}$ computations at 1 ms and 1000 cores parallel takes $10^6$ seconds~approx. 12 days even assuming extremely ambitious performance parameters). The online matrix manipulations performed by application 130 allow for a fast-moving data scenario where customer and product information get updated at a daily basis and allowing for much faster updates, if required. The online matrix manipulations are processed for individual customers and neighbors of the individual customer as determined by the application 130, and vastly reduce an amount of required computations. Additionally, the online matrix manipulations are done in two phases—those which are independent of the information the customer is interested earlier to allow for very fast computation when the actual recommendation is required.

The recommendation application 130 uses latent preference identification for the constrained filtering mention, and looks at both customer and product similarities to ensure that both new customers and new products are not affected by the recommendation process. For instance, the recommendation application 130 leverages deep neural networks to learn the latent preferences for new products prior to a threshold preference being exhibited. The neural network learns the mapping between product similarities and latent feature similarities. Further, the recommendation application 130 combines information from both offline and online user events in the recommendation process, and adds weights to different online events based on a statistical understanding of the data. The system 100 can be reused without any changes because the entire process is domain and source data independent given a standard format of customer features, product features and customer activity (utility) data.

Referring still to FIG. 1, the recommendation application 130 of the computing system 120 includes a receiving module 131, a first matrix processing module 132, a second matrix processing module 133, and a recommendation module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The receiving module 131 includes one or more components of hardware and/or software program code for receiving a user query on an online retail platform. For instance, the receiving module 131 receives a user search query for a particular product submitted via the front end user interface of the online retail platform 111. In an exemplary embodiment, the user is interacting with a chat-bot application of the online retail platform 111 to input a natural language request for a product or a product recommendation based on attributes input by the user. The words used by the user to form the user query are analyzed by the receiving module 131 to define a candidate set of attributes for constraining the recommendation, as described in greater detail infra. Moreover, the receiving module 131 identifies the user upon the user accessing the online retail platform 111. As soon as the user logs into the online retail platform 111, the receiving module 131 retrieves information/data specific to the user, such as last log in, past purchases, user preferences, browsing history, and other user-related data that is used to identify the user.

The first matrix processing module 132 includes one or more components of hardware and/or software program code for performing a first online matrix manipulation. The first online matrix manipulation includes querying a customer similarity matrix to determine customers that are the most similar to the user, creating a user feature matrix and a product features matrix, and obtaining a sparse data matrix based on the customer similarity matrix, the user feature matrix, and the products feature matrix.

Figure 2:
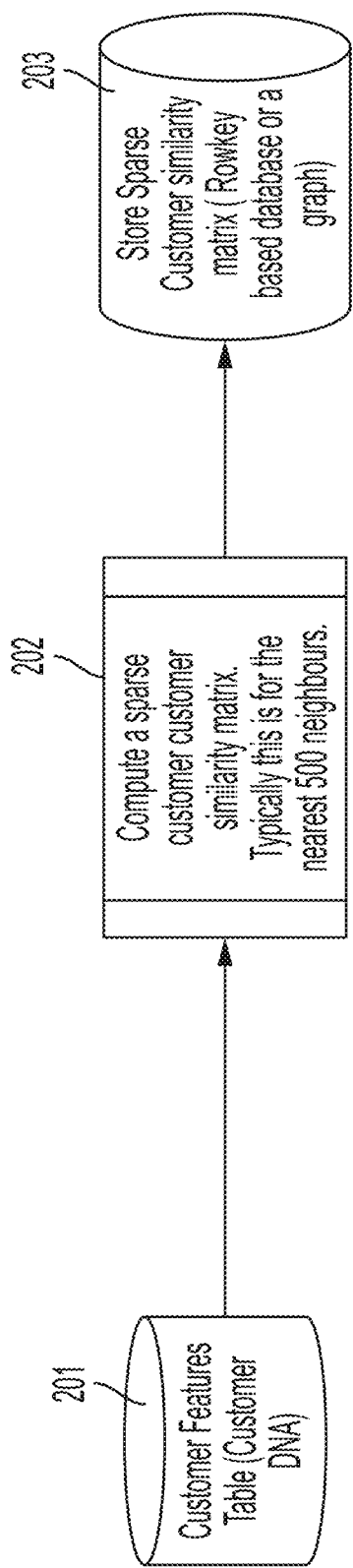
FIG. 2 depicts a flowchart depicting a creation of the customer similarity matrix, in accordance with embodiments of the present invention.
Figure 3:
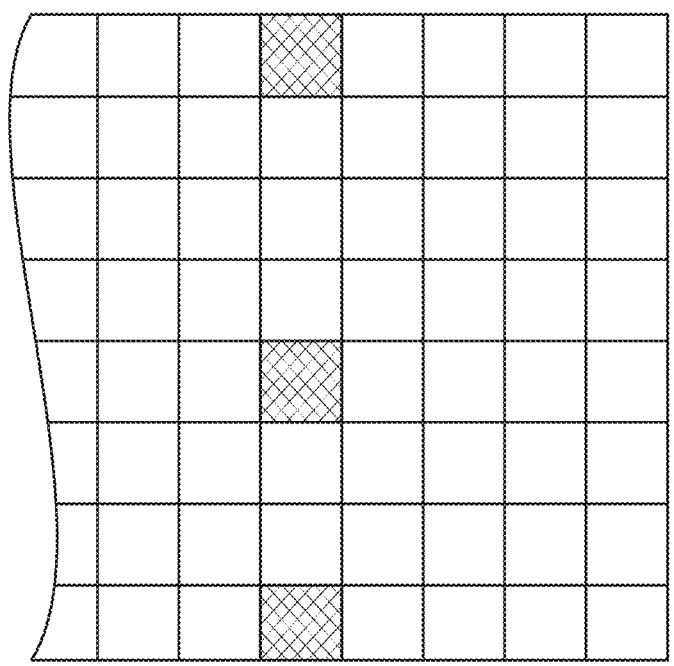
FIG. 3 depicts an embodiment of the customer similarity matrix, in accordance with embodiments of the present invention.

The customer similarity matrix determines a number of customers that are similar to the user, and is created in an offline batch process so that the first matrix processing module 132 can access, query, leverage, consult, etc. the customer similarity matrix in real-time while the user is interacting with the front end of the retail platform. For instance, the customer similarity matrix is a user-user matrix built on customer features. Customers with similar features are considered similar. FIG. 2 depicts a flowchart depicting a creation of the customer similarity matrix, in accordance with embodiments of the present invention. Customer features are stored in database 201. A sparse customer-customer similarity matrix is computed at 202 using the customer features in database 201. The customer similarity matrix is stored at 203. FIG. 3 depicts an embodiment of the customer similarity matrix 204, in accordance with embodiments of the present invention. The illustrated customer similarity matrix 204 includes four customers having three neighbors. The customer similarity matrix 204 has a single row chosen but all columns in a sparse vector format. By way of example:

C1: {C1:1, C2:0.7, C3:0.6}
C2: {C1:0.4, C2:1, C3:0.34)

The customer neighborhood is derived from above. This customer similarity matrix 204 is a sparse matrix and is maintained only for the closest customers. Typically, this is less than 50 for a 1M square matrix leading to a density of less than 0.05%.

Figure 4:
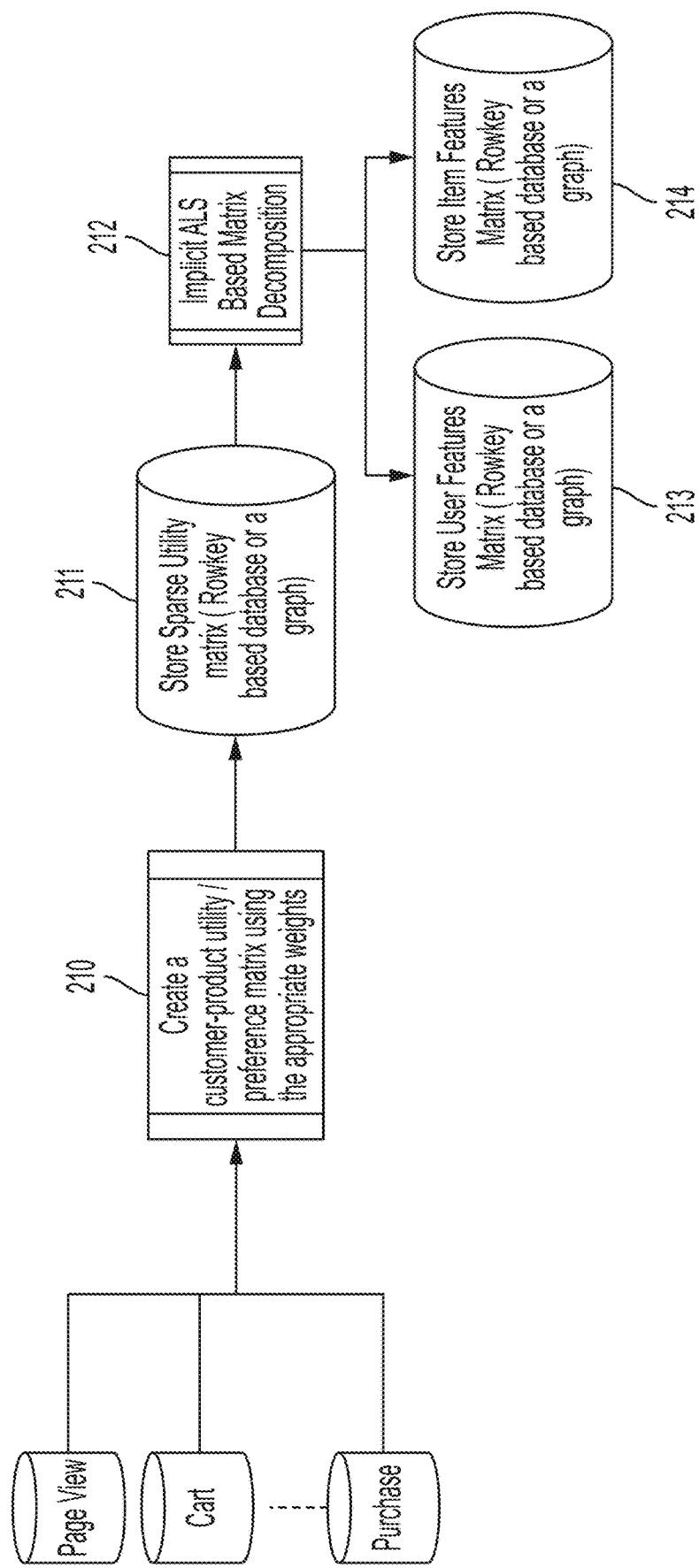
FIG. 4 depicts a flowchart depicting a creation of the user features matrix, in accordance with embodiments of the present invention.
Figure 5:
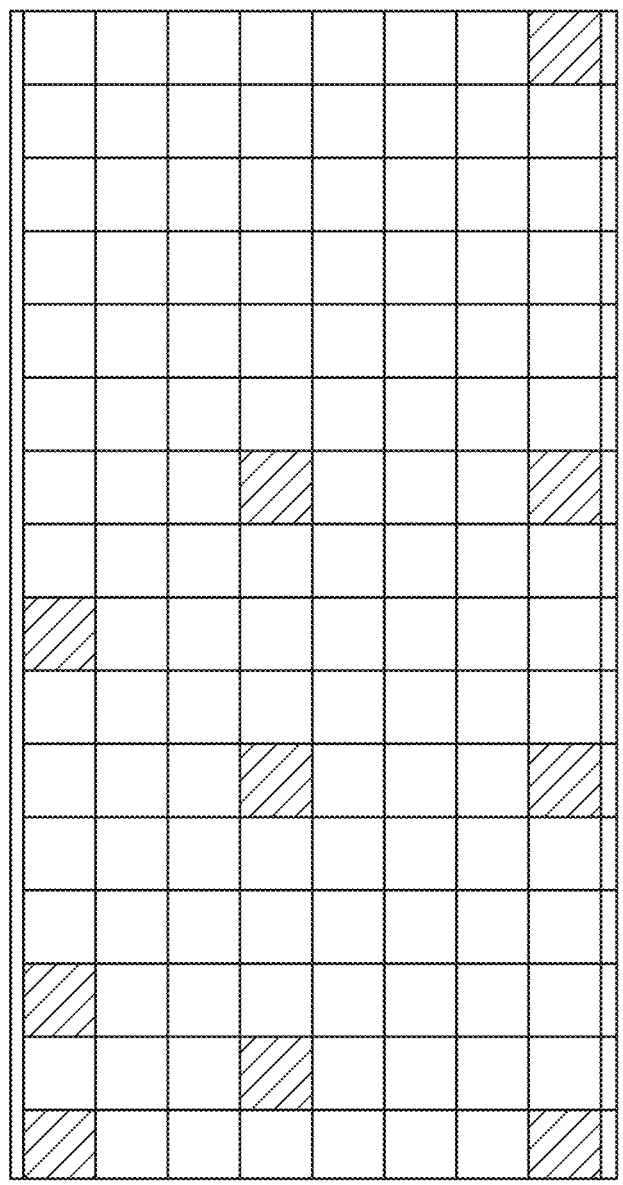
FIG. 5 depicts a utility matrix, in accordance with embodiments of the present invention

The user feature matrix contains user features and preferences of customers similar to the user. The user feature matrix is created using a utility matrix. FIG. 4 depicts a flowchart depicting a creation of the user features matrix, in accordance with embodiments of the present invention. The utility matrix is created at 210, which is a customer-product utility/preference matrix having appropriate weights assigned. The weights of each of the processes are different, and can be based on domain knowledge or statistical analysis. The utility matrix is derived from data sources such as page view, cart, and purchases of a customer. The utility matrix is stored at 211. The utility matrix has a preference weight for customers against products, which is derived for activities like offline purchases, online purchases, goods added to cart, goods in a wishlist, pages viewed etc. For example, for each customer, if the customer had made any of the events above, a good a weight is attached for that customer and the weight attached is, for example, 1 for purchases (either offline or online) and a ratio (<1) for other events. The ratio can be either via business rules (e.g. domain input) or via an analysis of the data. FIG. 5 depicts a utility matrix 219, in accordance with embodiments of the present invention. The illustrated utility matrix 219 highlights only the rows and columns where the customer and the customer's neighbors ave a preference toward a product.

Figure 6:
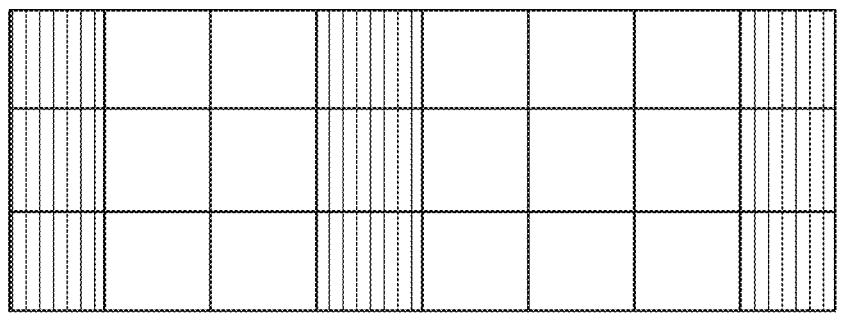
FIG. 6 depicts an embodiment of the user feature matrix, in accordance with embodiments of the present invention.
Figure 7:
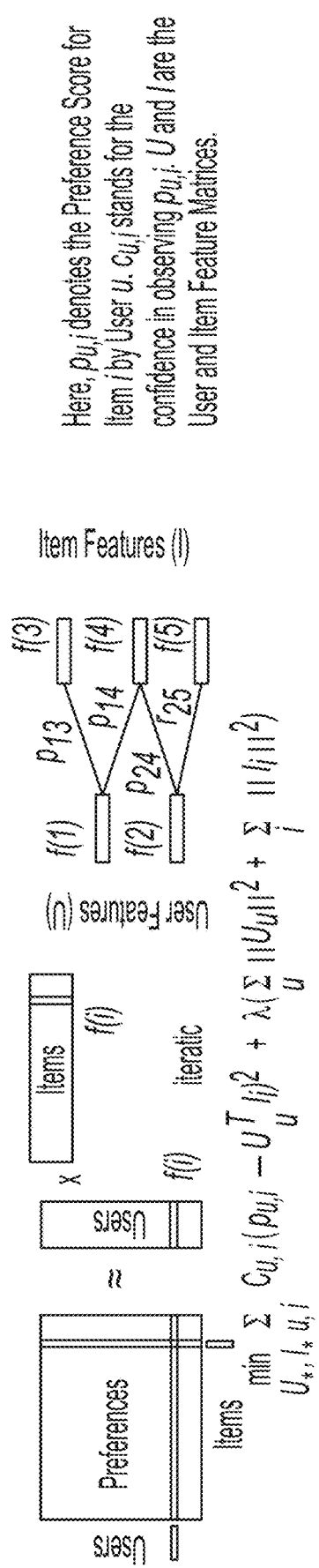
FIG. 7 depicts a decomposition of the utility matrix, in accordance with embodiments of the present invention.
Figure 8:
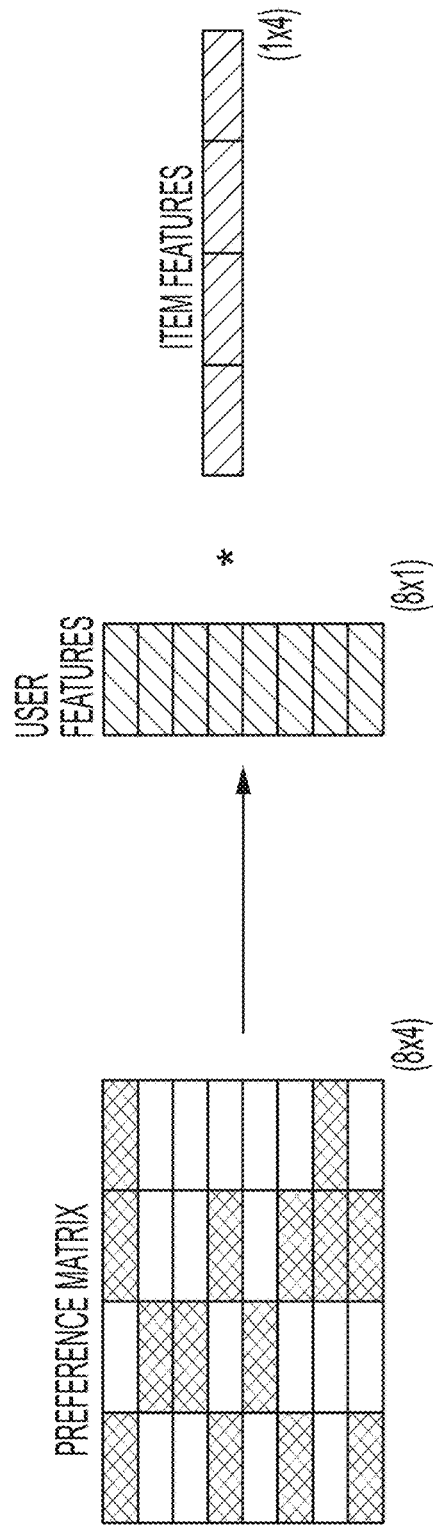
FIG. 8 depicts a manipulation of a utility/preference matrix, a user features matrix, and an item features matrix, in accordance with embodiment of the present invention.
Figure 9:
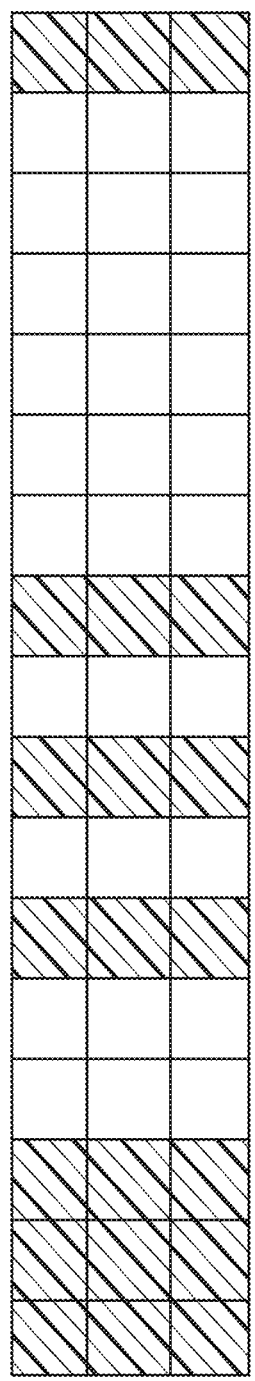
FIG. 9 depicts the product features matrix, in accordance with embodiments of the present invention.

FIG. 6 depicts an embodiment of the user feature matrix 215, in accordance with embodiments of the present invention. The illustrated user feature matrix 215 is a user feature matrix with k=3 choosing only the rows which are relevant to the neighbors of the customer, in sparse vector format. By way of example the utility matrix was decomposed into two lower rank matrices using (sparse) alternating least squares (ALS) algorithm. The ALS algorithm decomposes a sparse matrix into two lower rank matrices (approximately) so that each of the matrices are decomposed so that each of the vectors in the matrix form a latent feature expressed as a linear combination of the input attribute. The ALS algorithm does the optimization, as shown in FIGS. 7 and 8. The product features matrix contains product features of preferred products of customers similar to the user. The product feature matrix is created by referring to the utility matrix that contains a weighted preference for each product, as also shown in FIGS. 7 and 8. FIG. 9 depicts the product features matrix 216, in accordance with embodiments of the present invention. The illustrated product feature matrix 216 takes only those product features which are mapped to a union of the preferences of the customers. Referring back to FIG. 4, the product feature matrix 216 is stored at 214.

Figure 10:
FIG. 10 depicts a sparse data matrix, in accordance with embodiments of the present invention.

Moreover, the first matrix processing module 132 obtains a sparse data matrix based on the customer similarity matrix, the user feature matrix, and the products feature matrix. For instance, the first matrix processing module 132 multiples the customer similarity matrix, the user feature matrix, and the products feature matrix to obtain the spare data matrix, which is stored in a dictionary format in an in-memory NoSQL database. FIG. 10 depicts the sparse data matrix 218, in accordance with embodiments of the present invention.

Referring again to FIG. 1, the second matrix processing module 133 includes one or more components of hardware and/or software program code for creating a product similarity matrix based on a candidate set of attributes extracted from the user query, and filtering the results of the sparse data matrix with the product similarity matrix to determine a list of ranked recommended products for the user. The product similarity matrix is an item-item matrix built on product features like brand, category, color, season, etc. Products are considered similar if the products have similar attributes. A similarity score is measured by Jaccard similarity of attributes, which can usually be hosted in product master or product DNA data stores. To handle missing attributes from the product master, a default threshold score is applied to products within the same category e.g. By way of example:

P1: {P1:1, P2:0.33, P3:0.251}
P2: {P1:0.33, P2:1, P3:0.67)

This similarity is done between goods in the same category defined in the product hierarchy and by definition. Similarity between goods in different categories is zero. For example, the similarity between blue jeans and shoes is by definition zero—this heuristic is based on business knowledge as well as helping maintain a threshold of 5%.

Figure 11:
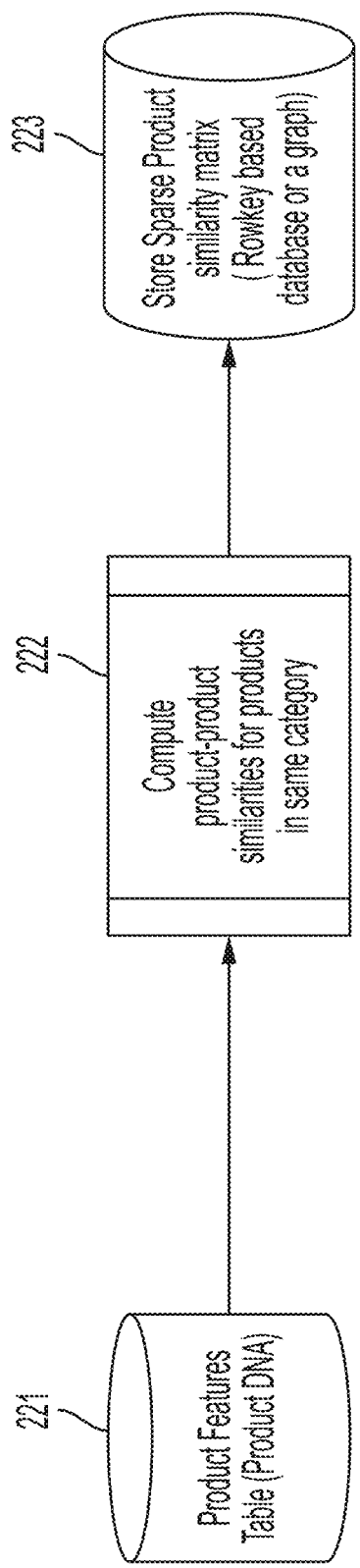
FIG. 11 depicts a flowchart depicting a creation of the product similarity matrix, in accordance with embodiments of the present invention.

FIG. 11 depicts a flowchart depicting a creation of the product similarity matrix, in accordance with embodiments of the present invention. Product features are stored in database 221. A product-product similarity matrix is computed at 222 using the product features in database 221. The sparse product similarity matrix is stored at 223.

Figure 12:
FIG. 12 depicts a sparse matrix retrieved from a database, in accordance with embodiments of the present invention.
Figure 13:
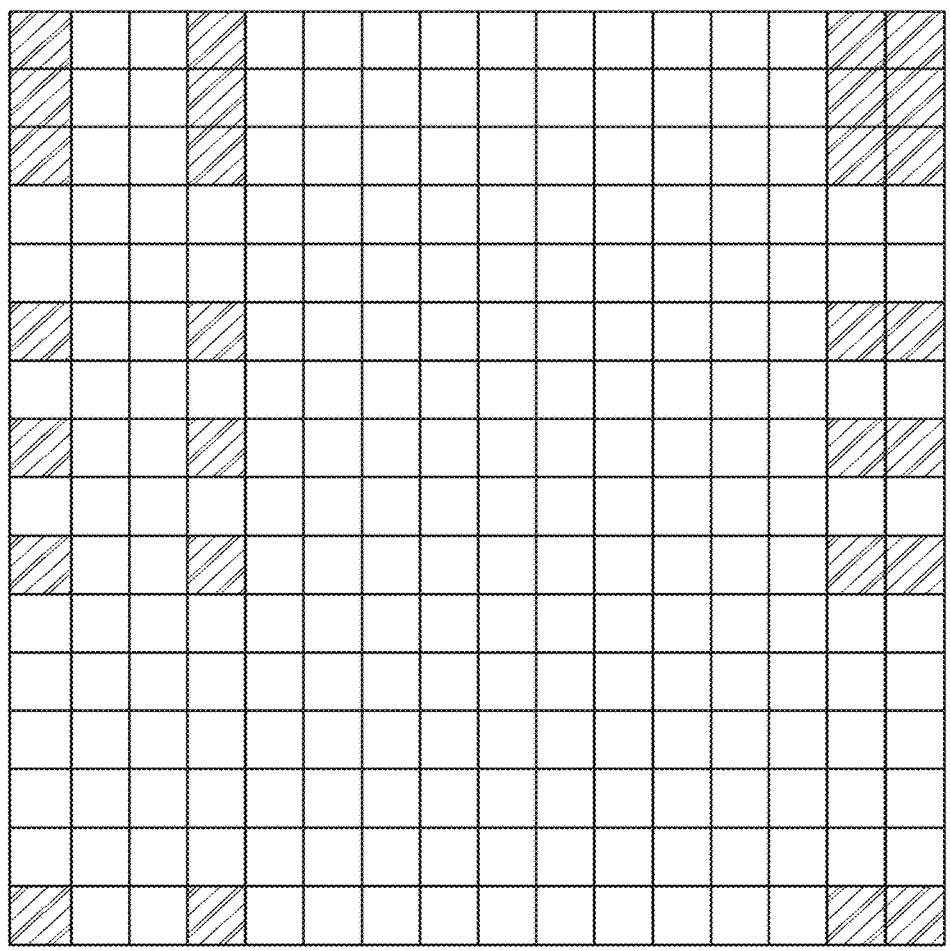
FIG. 13 depicts a filtered sparse data matrix, in accordance with embodiments of the present invention.
Figure 14:
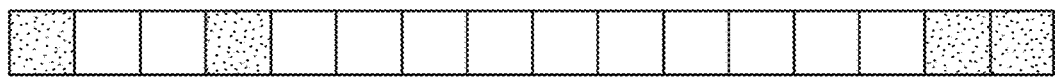
FIG. 14 depicts a final matrix, in accordance with embodiments of the present invention.

Moreover, the second matrix processing module 133 filters the results of the sparse data matrix 218 with the product similarity matrix to determine a list of ranked recommended products for the user. For instance, the second matrix processing module 133 retrieves the dictionary from the in-memory NoSQL, database and converts it to a sparse vector format, as shown in FIG. 12. The filtered spare matrix 218' is shown in FIG. 13. The user query parameters lead to only the columns that are part of the candidate set because the second matrix processing module 133 uses constrained collaborative filtering. The retrieved matrix and the filtered sparse matrix 218' are multiplied to determine a final matrix 225 (shown in FIG. 14) that includes the final scores, which are sorted to determine the top N recommendations (e.g. top four recommendations).

Figure 15:
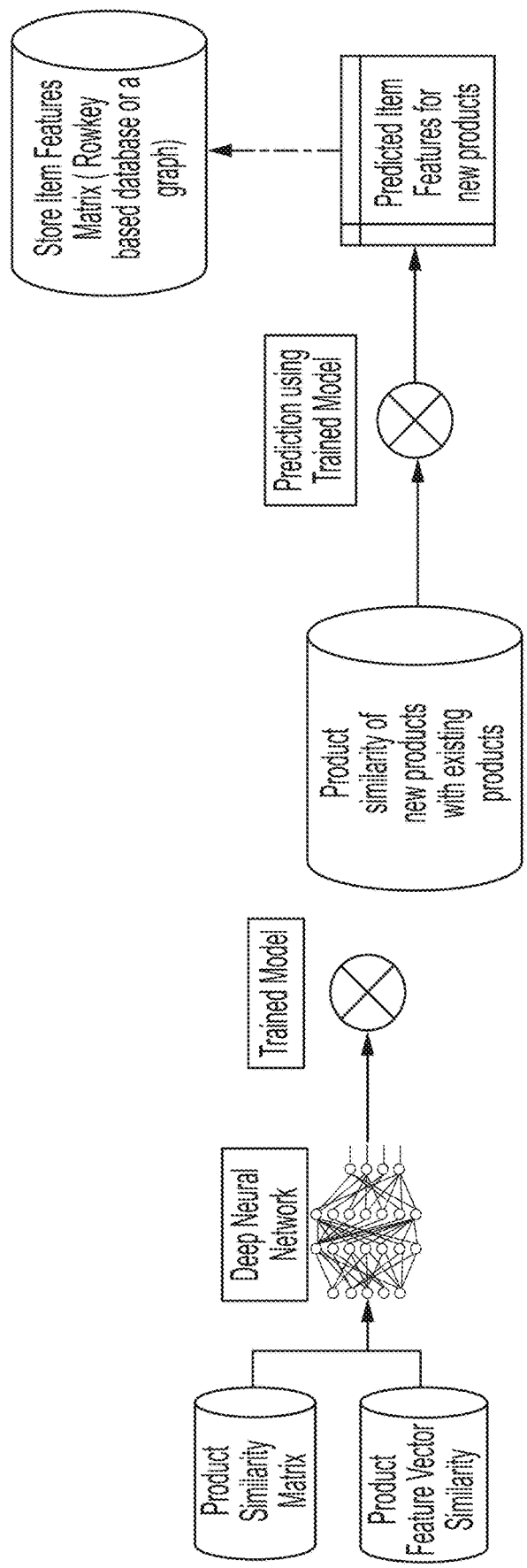
FIG. 15 depicts the use of a trained neural network, in accordance with embodiments of the present invention.

Furthermore, the second matrix processing module 133 trains a deep neural network to obtain a trained model that is used to predict product features for new products to be used with the product feature matrix. For instance, the second matrix processing module 133 leverages deep neural networks for new products because new products will not appear at all in the utility matrix. Thus, for new products and up to a certain threshold preference the second matrix processing module 133 trains a deep neural network to learn a mapping between the product similarity and the item features based similarity for new products, based on the fact that similar products have similar latent features. Accordingly, for new products, the second matrix processing module 133 uses the product similarity learned from the product attributes only and use the trained neural network to predict a low dimension embedding of the deep neural network. The output from the neural network is appended to the database 221. FIG. 15 depicts the use of a trained neural network, in accordance with embodiments of the present invention.

Referring back to FIG. 1, the recommendation module 134 includes one or more components of hardware and/or software program code for sending the list of ranked recommended products to the user with the list of recommended products. In an exemplary embodiment, the recommendation is provided to the user in the chatbot application in a conversational context.

An implementation of the recommendation system 100 will now be described with reference to FIG. 16, which depicts a flowchart of a method 300 for modeling preferences of customers to drive personalized contextual recommendations using cognitive deep constrained filtering, in accordance with embodiments of the present invention. The system 100 is based on customer neighborhood, product similarity, utility matrix, user features, product features, deep neural network trained models for learning new products.

Figure 16A:
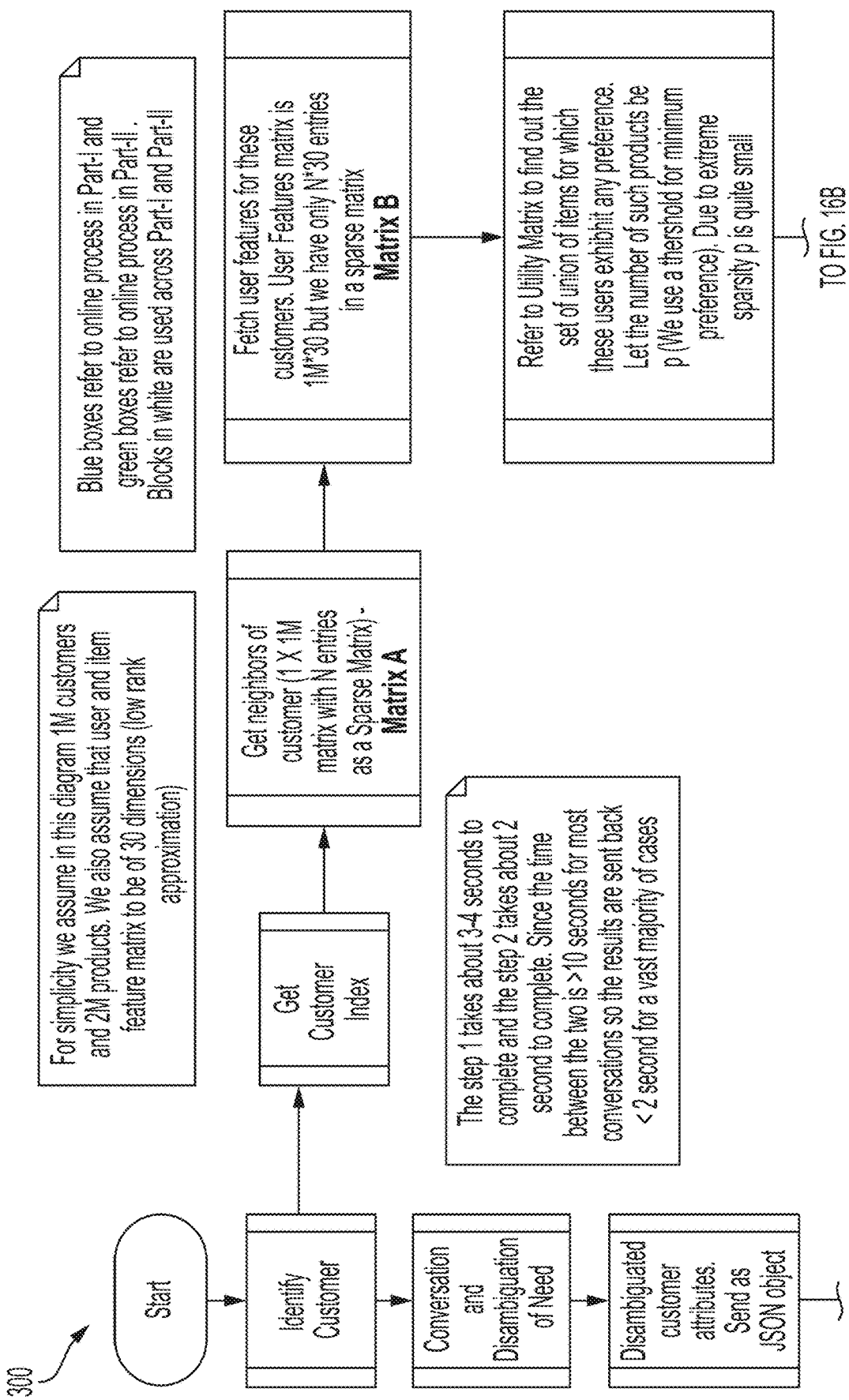
FIG. 16A depicts a flowchart of a method for modeling preferences of customers to drive personalized contextual recommendations using cognitive deep constrained filtering, in accordance with embodiments of the present invention.
Figure 16B:
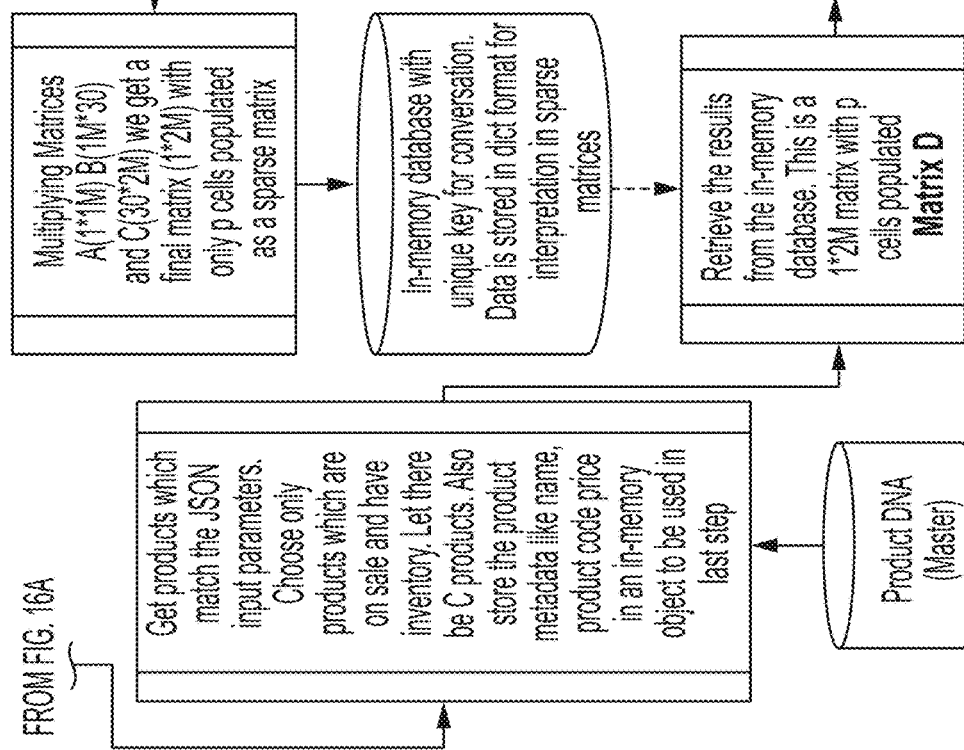
FIG. 16B depicts a flowchart of a method for modeling preferences of customers to drive personalized contextual recommendations using cognitive deep constrained filtering, in accordance with embodiments of the present invention.

As shown in FIG. 16, the method 300 for modeling preferences of customers to drive personalized contextual recommendations using cognitive deep constrained filtering is comprised of two different paths, namely, a path specific to the customer and a path specific to the product. The first path includes fetching the customer details, such as a customer index (e.g. a surrogate generated as sequence), fetching the customer's neighbor information along with the similarities, fetching the user features of the neighbors, referring to the utility matrix to find out the set of union of items for which the customers exhibit any preference, and determining a number of such products be p (using a threshold for minimum preference). Due to extreme sparsity p is q, fetching the item features of the preferred items: k×p, wherein p is assumed to be a total number of items. The final result of the first path is a sparse matrix where information for only the preferred items (e.g. limited by another Threshold) is present. A number of non-zero entries are equal to number of preferred items, which are mapped by their indices. The items are mapped by their indices.)

The second path includes obtaining products which match the JSON input parameters from the user query and selecting only products based on one or more criteria (e.g. on sale, in stock, etc.) Let there be C products, in which the product metadata like name, product code price are stored in an in-memory database storing the sparse data matrix. The results are retrieved from the in-memory database, which is a 1*2M matrix with p cells populated matrix, and the 2M*2M product similarity matrix is filtered to only take those rows which match the p products and the products which match the C products in the candidate set. The matrices are multiplied to get a 1*2M matrix with only C cells populated. Finally, the system 100 selects the top recommendations, which is sent to the user.

The online process of the deep constrained collaborative filtering may be divided into several parts. Further, the matrices depicted in the drawings are a simple simulated example of the method proceeds with the calculations using small matrices. The matrices are far sparser than is depicted herein. The customer similarity matrix typically has only 0.05% cells populated and the product feature matrix has about 30 cells populated. The candidate set is typically 100-250 products matching all the customer's query inputs and which has inventory at a point in time. The system 100 is designed to generate recommendations for each user, requiring the recommendations to match constraints. For example, if a user identifies some attributes like "Levis Blue Jeans", then the system 100 tries to generate recommendations matching those parameters. Therefore, the system employs a constrained filtering. If the set is too small (<3 recommendation size, say 8), the system 100 does a soft filtering to increase the candidate set based on attribute importance (e.g. fit for jeans may be more important than style). So, if the candidate set is small, then the system 100 modifies the candidate set prior to generating a recommendation by relaxing the least important of the attributes for that user. However, once this is done, constrained filtering inside the candidate set is still performed. By way of example, suppose there are m Users and n Items. In that case, the learned User and Item features from the matrix will have dimensions: User Features: m×k and Item Features: k×N. Here, k stands for the rank of the matric. Assuming there are N number of neighbors for a given user, where N is variable for each user, Let P denote a number of Products for which users have a preference. That is, the number of non-zero entries in Utility Matrix constrained only on users in a given neighborhood of size N. Let C denote the number of products in the candidate set, where there may or may not be overlaps between P and C. The system 100 leverages the fact that the calculations involving user features, customer similarity and preferences are independent and can be pre-computed as soon as the user starts interacting with the system 100. The candidate set calculations depends on the dynamic constraints imposed by user during the conversation with the online retail platform front end.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Figure 17:
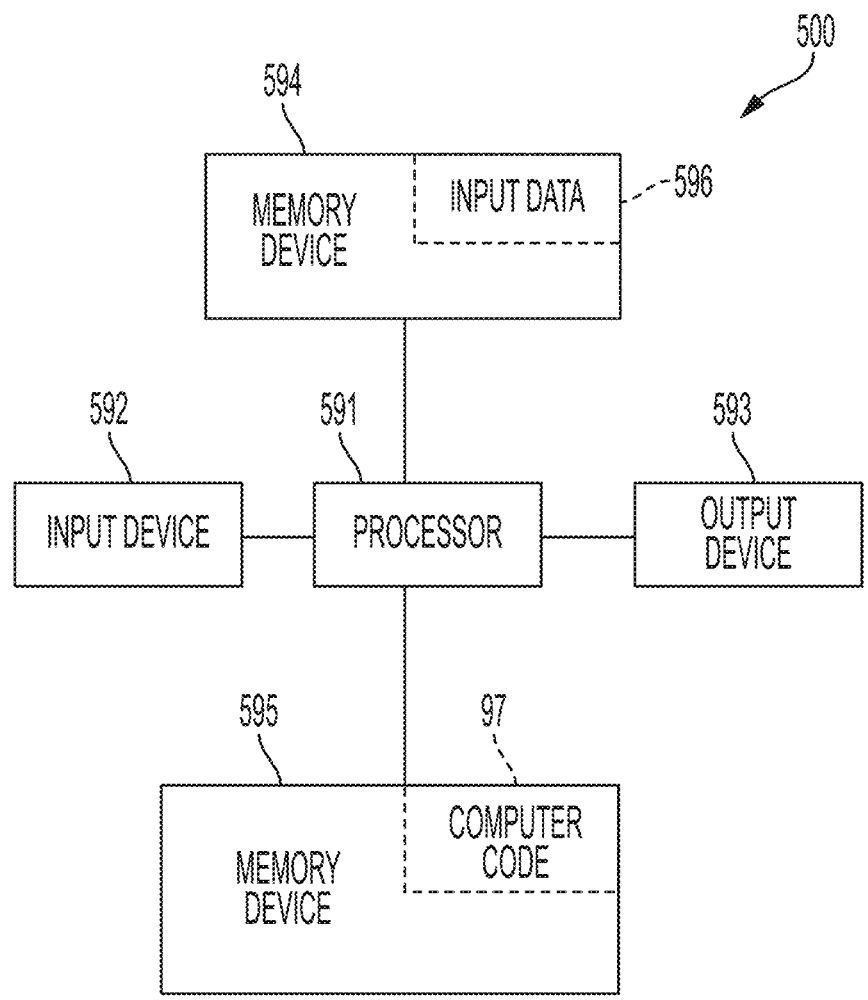
FIG. 17 depicts a block diagram of a computer system for recommendation of FIGS. 1-15, capable of implementing a method for modeling preferences of customers to drive personalized contextual recommendations using cognitive deep constrained filtering of FIG. 16, in accordance with embodiments of the present invention.

FIG. 17 depicts a block diagram of a computer system for the recommendation system 100 of FIGS. 1-15, capable of implementing methods for modeling preferences of customers to drive personalized contextual recommendations using cognitive deep constrained filtering of FIG. 16, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for modeling preferences of customers to drive personalized contextual recommendations using cognitive deep constrained filtering in the manner prescribed by the embodiments of FIG. 16 using the recommendation system 100 of FIGS. 1-15, wherein the instructions of the computer code 597 may be executed by processor 591 via memory device 595. The computer code 597 may include software or program instructions that may implement one or more algorithms for implementing the method for modeling preferences of customers to drive personalized contextual recommendations using cognitive deep constrained filtering, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 17.

In some embodiments, the computer system 500 may further be coupled to an input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc.

The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to modeling preferences of customers to drive personalized contextual recommendations using cognitive deep constrained filtering. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to model preferences of customers to drive personalized contextual recommendations using cognitive deep constrained filtering. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for modeling preferences of customers to drive personalized contextual recommendations using cognitive deep constrained filtering. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for modeling preferences of customers to drive personalized contextual recommendations using cognitive deep constrained filtering.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing, device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
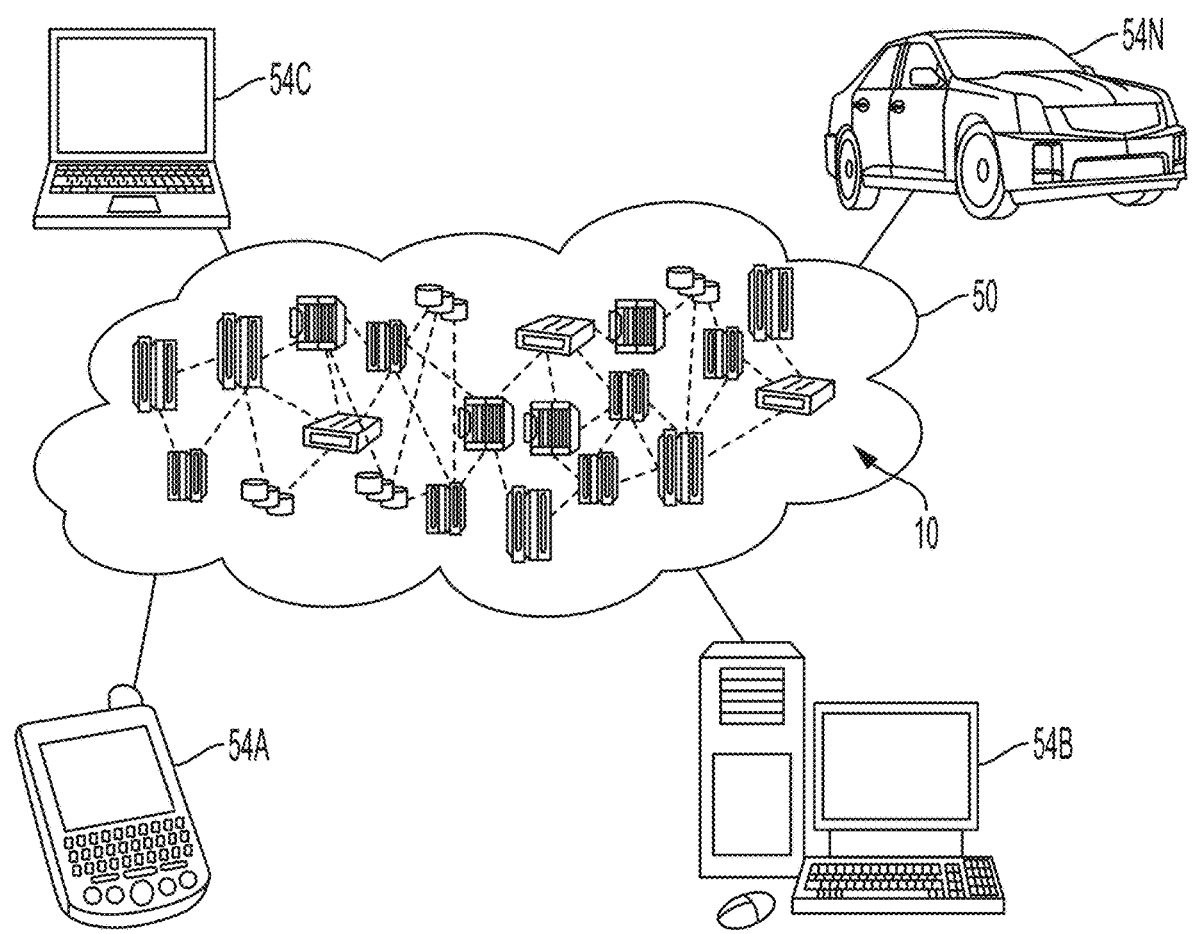
FIG. 18 depicts a cloud computing environment, in accordance with embodiments of the present invention.

Referring now to FIG. 18, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for cloud consumer does not need to maintain resources on a local computing device. It is understood that the types of computing devices 54A, 54B, 54C and 54N shown in FIG. 18 are intended to be illustrative only and that computing nodes 10 and cloud computing environment 50 can communicate with any type of computerized device over any type of network and/or network addressable connection (e.g., using a web browser).

Figure 19:
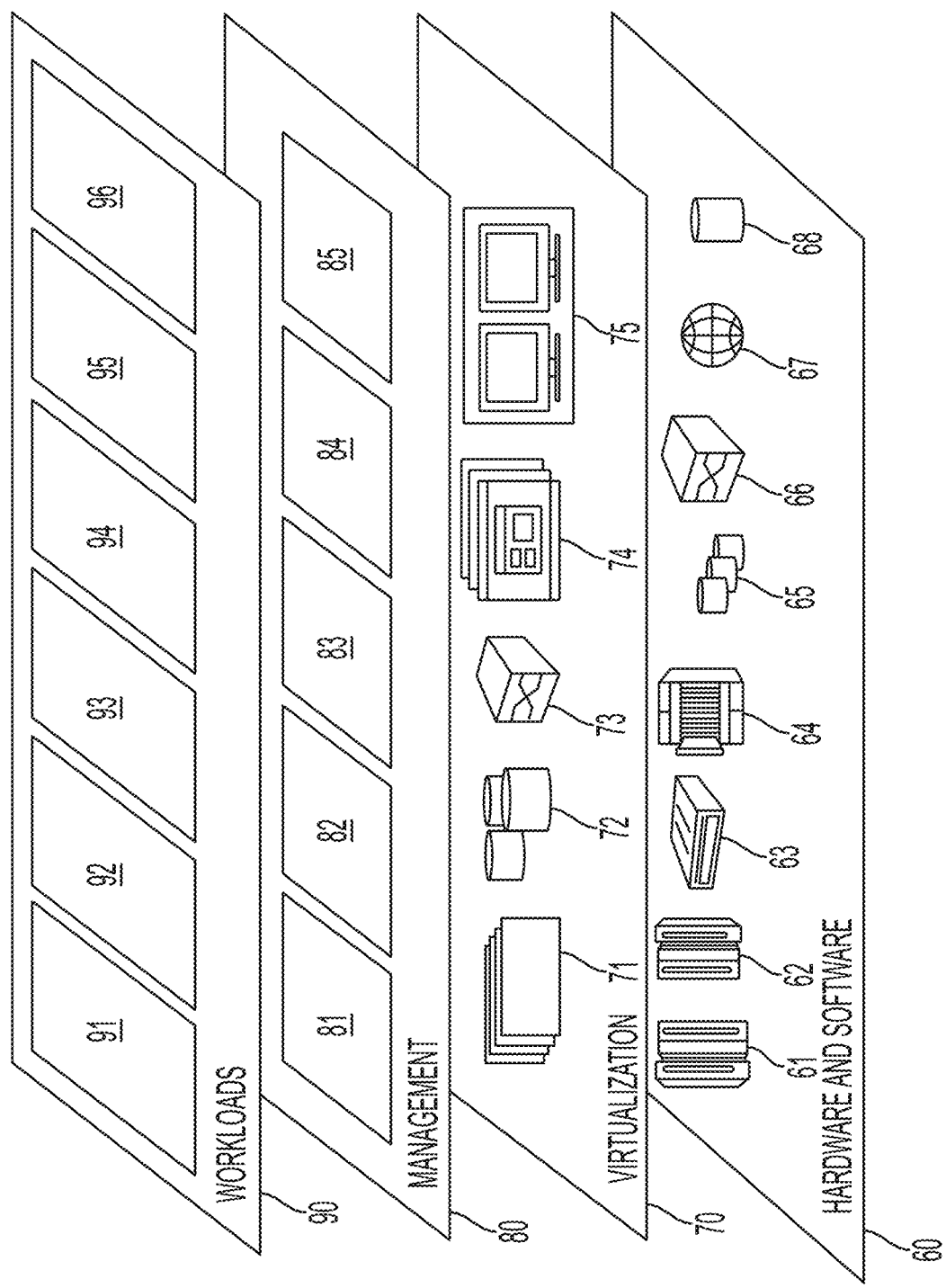
FIG. 19 depicts abstraction model layers, in accordance with embodiments of the present invention.

Referring now to FIG. 19, a set of functional abstraction layers provided by cloud computing environment 50 (see FIG. 18) are shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and personalized contextual recommendations using cognitive deep constrained filtering 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for modeling preferences of customers to drive personalized contextual recommendations using cognitive deep constrained filtering, the method comprising:
   receiving, by a processor of a computing system, a user query input into a front end interface generated by an online retail platform, the front end user interface transmitted to a user computing device by the online retail platform to enable interaction between a user and the online retail platform, wherein the user is identified upon accessing the online retail platform;
   in response to receiving the user query, performing, by the processor, a first online matrix manipulation and a second online matrix manipulation,
      wherein the first online matrix manipulation includes:
         querying a customer similarity matrix while the user is interacting with the front end interface to identify customers most similar to the user, the customer similarity matrix created by the processer communicating with a plurality of neighboring computing devices associated with neighbors of the user to determine a number of neighbors that are similar to the user;

creating a user feature matrix and a product features matrix specific to the user and a product in the user query, respectively;

storing the product features matrix on a database connected to the computing system over a network; and obtaining a sparse data matrix based on the customer similarity matrix, the user feature matrix, and the products feature matrix;

wherein the second online matrix manipulation includes:

creating a product similarity matrix based on a candidate set of attributes extracted from the user query, filtering the results of the sparse data matrix with the product similarity matrix to determine a list of ranked recommended products for the user;

training, by the processor, a model with a deep neural network using data from the product similarity matrix and data from the product feature matrix as inputs to obtain a trained model;

inputting, by the processor, a new product information into the trained model to map product similarity and item features of existing products to new products to predict product features for new products to be used with the product feature matrix;

updating, by the processor, the database storing the product features matrix to revise the product features matrix over time as new products become available; and sending, by the processor, the list of ranked recommended products to the front end user interface of the user computing device.

2. The method of claim 1, wherein the user query is received through a chatbot application of the online retail platform, and the list is provided to the user in the chatbot application in a conversational context.

3. The method of claim 1, wherein the customer similarity matrix is created offline and queried in response to the user being identified.

4. The method of claim 1, wherein the user feature matrix contains user features and preferences of customers similar to the user.

5. The method of claim 1, wherein the product feature matrix contains product features of preferred products of customers similar to the user, further wherein the product feature matrix is created by referring to a utility matrix that contains a weighted preference for each product.

6. The method of claim 1, wherein the recommendation is constrained to the candidate set.

7. A computing system, comprising:
a processor;
a memory device coupled to the processor; and
a computer readable storage device coupled to the processor, wherein the storage device contains program code executable by the processor via the memory device to implement a method for modeling preferences of customers to drive personalized contextual recommendations using cognitive deep constrained filtering comprising:

receiving, by processor, a user query input into a front end interface generated by an online retail platform, the front end user interface transmitted to a user computing device by the online retail platform to enable interaction between a user and the online retail platform, wherein the user is identified upon accessing the online retail platform;

in response to receiving the user query, performing, by the processor, a first online matrix manipulation and a second online matrix manipulation, wherein the first online matrix manipulation includes:

querying a customer similarity matrix while the user is interacting with the front end interface to identify customers most similar to the user, the customer similarity matrix created by the processer communicating with a plurality of neighboring computing devices associated with neighbors of the user to determine a number of neighbors that are similar to the user;

creating a user feature matrix and a product features matrix specific to the user and a product in the user query, respectively;

storing the product features matrix on a database connected to the computing system over a network; and obtaining a sparse data matrix based on the customer similarity matrix, the user feature matrix, and the products feature matrix;

wherein the second online matrix manipulation includes:

creating a product similarity matrix based on a candidate set of attributes extracted from the user query, filtering the results of the sparse data matrix with the product similarity matrix to determine a list of ranked recommended products for the user;

training, by the processor, a model with a deep neural network using data from the product similarity matrix and data from the product feature matrix as inputs to obtain a trained model;

inputting, by the processor, a new product information into the trained model to map product similarity and item features of existing products to new products to predict product features for new products to be used with the product feature matrix;

updating, by the processor, the database storing the product features matrix to revise the product features matrix over time as new products become available; and sending, by the processor, the list of ranked recommended products to the front end user interface of the user computing device.

8. The computing system of claim 7, wherein the user query is received through a chatbot application of the online retail platform, and the recommendation is provided to the user in the chatbot application in a conversational context.

9. The computing system of claim 7, wherein the customer similarity matrix is created offline and queried in response to the user being identified.

10. The computing system of claim 7, wherein the user feature matrix contains user features and preferences of customers similar to the user.

11. The computing system of claim 7, wherein the product feature matrix contains product features of preferred products of customers similar to the user, further wherein the product feature matrix is created by referring to a utility matrix that contains a weighted preference for each product.

12. The computing system of claim 7, wherein the recommendation is constrained to the candidate set.

13. A computer program product, comprising a computer readable hardware storage device storing a computer readable program code, the computer readable program code comprising an algorithm that when executed by a computer processor of a computing system implements a method for modeling preferences of customers to drive personalized contextual recommendations using cognitive deep constrained filtering, comprising:

receiving, by the processor, a user query input into a front end interface generated by an online retail platform, the front end user interface transmitted to a user computing device by the online retail platform to enable interaction between a user and the online retail platform, wherein the user is identified upon accessing the online retail platform;

in response to receiving the user query, performing, by the processor, a first online matrix manipulation and a second online matrix manipulation, wherein the first online matrix manipulation includes:

querying a customer similarity matrix while the user is interacting with the front end interface to identify customers most similar to the user, the customer similarity matrix created by the processer communicating with a plurality of neighboring computing devices associated with neighbors of the user to determine a number of neighbors that are similar to the user;

creating a user feature matrix and a product features matrix specific to the user and a product in the user query, respectively;

storing the product features matrix on a database connected to the computing system over a network; and obtaining a sparse data matrix based on the customer similarity matrix, the user feature matrix, and the products feature matrix;

wherein the second online matrix manipulation includes:

creating a product similarity matrix based on a candidate set of attributes extracted from the user query, filtering the results of the sparse data matrix with the product similarity matrix to determine a list of ranked recommended products for the user;

training, by the processor, a model with a deep neural network using data from the product similarity matrix and data from the product feature matrix as inputs to obtain a trained model;

inputting, by the processor, a new product information into the trained model to map product similarity and item features of existing products to new products to predict product features for new products to be used with the product feature matrix;

updating, by the processor, the database storing the product features matrix to revise the product features matrix over time as new products become available; and sending, by the processor, the list of ranked recommended products to the front end user interface of the user computing device.

14. The computer program product of claim 13, wherein the user query is received through a chatbot application of the online retail platform, and the recommendation is provided to the user in the chatbot application in a conversational context.

15. The computer program product of claim 13, wherein the customer similarity matrix is created offline and queried in response to the user being identified.

16. The computer program product of claim 13, wherein the user feature matrix contains user features and preferences of customers similar to the user, and the product feature matrix contains product features of preferred products of customers similar to the user, further wherein the product feature matrix is created by referring to a utility matrix that contains a weighted preference for each product.

17. The computer program product of claim 13, wherein the recommendation is constrained to the candidate set.

* * * * *